US010083576B1

(12) United States Patent
Hedge, Jr. et al.

(10) Patent No.: US 10,083,576 B1
(45) Date of Patent: Sep. 25, 2018

(54) PARLAY BLACKJACK PROPOSITIONS AND COMMUNITY SIDE-BETS

(71) Applicants: J. Richard Hedge, Jr., Chandler, AZ (US); Aviva R. Hedge, Chandler, AZ (US)

(72) Inventors: J. Richard Hedge, Jr., Chandler, AZ (US); Aviva R. Hedge, Chandler, AZ (US)

( * ) Notice: Subject to any disclaimer, the term of this patent is extended or adjusted under 35 U.S.C. 154(b) by 0 days.

(21) Appl. No.: 14/999,450

(22) Filed: May 7, 2016

Related U.S. Application Data

(63) Continuation-in-part of application No. 13/987,892, filed on Sep. 13, 2013, now Pat. No. 9,370,709.

(51) Int. Cl.

| | |
|---|---|
| ***A63F 13/00*** | (2014.01) |
| ***G07F 17/32*** | (2006.01) |
| ***A63F 1/00*** | (2006.01) |

(52) U.S. Cl.
CPC ............ *G07F 17/3258* (2013.01); *A63F 1/00* (2013.01); *G07F 17/3293* (2013.01); *A63F 2001/003* (2013.01)

(58) Field of Classification Search
None
See application file for complete search history.

(56) References Cited

U.S. PATENT DOCUMENTS

| | | | | |
|---|---|---|---|---|
| 5,743,532 A * | 4/1998 | Lafferty | A63F 3/00157 273/292 | |
| 6,511,070 B1 * | 1/2003 | Daines | A63F 3/00157 273/274 | |
| 7,144,011 B2 * | 12/2006 | Asher | G07F 17/32 273/292 | |
| 8,465,021 B2 * | 6/2013 | Asher | G07F 17/3293 273/292 | |
| 8,474,819 B2 * | 7/2013 | Asher | G07F 17/3293 273/274 | |
| 2005/0059451 A1 * | 3/2005 | Shackleford | G07F 17/32 463/13 | |
| 2007/0085274 A1 * | 4/2007 | Asher | G07F 17/32 273/292 | |
| 2007/0241506 A1 * | 10/2007 | Kling | A63F 1/00 273/292 | |
| 2008/0067745 A1 * | 3/2008 | Wikstrom | A63F 1/00 273/292 | |

* cited by examiner

*Primary Examiner* — Sunit Pandya

(57) ABSTRACT

The Applicants are proliferating a progressively modified process for playing Blackjack using and/or displaying either standard decks or modified decks of cards. These processes also engage either a "live action" table play, or electronic gaming apparatuses, as accommodated for. Players initiate play, via standardized Blackjack rules for both "Primary & Secondary 'Base' play action(s)." As such, all customarily engaged wagers of variable risks are in play against the Dealer's hand. However, Players can now enjoy as never before; a superseding, Secondary Decision-Proposition means of processes; allowing for a new mid-hand entry of Community Ante-up wagers that too, are entered won or lost, before the Dealer reveals their "Hole" card! There is a "Mercy safety-net" inducing its ameliorating affects during the game's parlay action play, as well.

2 Claims, 12 Drawing Sheets

COUNSEL I

*HOW TO PLAY:*

Players book their initial "Primary" contract wagers and optional "Ante" wager Side-Bets.

Players are dealt Two (2) cards one at a time, up or down.

Dealers are dealt One (1) card up, and One (1) card down, as their "Hole" card.

Players may draw card(s) until their best possible hand is made to "Stand Pat" or "Busts."

*BLACKJACK'S PRIMARY & SECONDARY "BASE" PLAY ACTION RULES:*

MANY PLAY ACTIONS ARE PLAYED AND "WON" IN THIS GENERAL MANNER.

Players always "Win" hole-count Blackjack!

Players can Double Down on: Any Two (2) cards.

Players can Split any initial pair of cards: Three times for a total of Four Hands.

Fig. 9a

Players can Double Down on any Split cards: One (1) card to Ten's & Ace's.

Players can "Surrender" for "Half" their contract wager. All Side-Bets fall to the House.

All hand count tallies *over* Twenty-One (21) are "Busted," and lose.

All hand count tallies "Standing Pat" *short* of the Dealer's hand count are "Sacked," and lose.

*THE OPTIONAL PARLAY BLACKJACK REPLAY & THE SPLIT POWER HANDS:*

ACTIONS BEGIN & END FOR THE PLAYER; "BEFORE" THE DEALER REVEALS THEIR "HOLE" CARD.

Players can Triple Down on any: Optional Ace-Ten / Parlay Blackjack™ replay. One (1) card to each new hand.

Players can Triple Down: after Splitting any Ace-Ace / Power Aces™. One (1) card to each new hand.

Players can Triple Down: after Splitting any Ten-Ten / Power 20™. One (1) card to each new hand.

Players can Ante-up for playing "Community Play Blackjack replay side-bets," as the opportunity permits.

*SIDE-BETS:*

All first Two (2) card, "Ante-up" types of side-bet wagers are displayed tableside with their Bonus Payoffs.

All first Three (3) card, "Ante-up" types of side-bet wagers are displayed tableside with their Bonus Payoffs.

All applicable "Community Blackjack replay" side-bet wagers are displayed tableside with their Bonus Payoffs.

*A DEALER'S HAND IS IN PLAY ACTION*

*PRIMARY "BASE" PLAY ACTION:*

WINNING HANDS, TIE HANDS LOSING HANDS & STANDING "PAT" AGAINST THE DEALER'S HAND.

*PLAYER'S "WINNING" HAND TALLY'S:*

IF: A Player "Stands Pat" with a hand of: "BLACKJACK."

THEN: The Player always "Wins," even against a Dealer's BLACKJACK.

SO: The Players are paid: At least, EVEN MONEY on their "Contract Wager."

*(CONTINUED IN FIG. 9b)*

*PLAYER'S "TIE" HAND TALLY'S:*

IF: A Player's hand tally finishes with the same total as the Dealer's hand tally, this is a "TIE."

THEN: The Player's hand is a "Push / Tie."

SO: The Player doesn't win or lose.

*PLAYER'S "LOSING" HAND TALLY'S*

IF: A Player's hand tally stands short of the Dealer's hand tally outcome.

THEN: The Player(s) are "Sacked," and LOSE.

SO: The Player(s) lose: 100% of their *total* contract wager. Player(s) are "Busted," and LOSE over 21.

*PLAYER'S "STANDING PAT" AGAINST THE DEALER'S HAND:*

IF: A Player "Stands Pat" at any point of play.

THEN: The Player must "Beat" the Dealer's hand tally to Win.

SO: If, the Player "Beats" the Dealer's hand tally without "Busting" they "Win." If not, they lose...

*SECONDARY "BASE" PLAY ACTION:*
DOUBLING DOWN & DOUBLING ON SPLIT CARDS AGAINST THE DEALER'S HAND.

*PLAYER'S "WINNING" HAND TALLY'S:*

IF: A Player "Doubles Down," and their hand tally "Beats" the Dealer's hand tally.

THEN: The Player(s) "Win."

SO: The Player(s) are paid: EVEN MONEY, on the full wager.

*Fig. 9b*

*PLAYER'S "TIE" HAND TALLY'S:*

IF: A Player's hand tally finishes with the same total as the Dealer's hand tally, this is a "TIE."

THEN: The Player's hand is a "Push / Tie."

SO: The Players doesn't win or lose.

*PLAYER'S "LOSING" HAND TALLY'S:*

IF: A Player "Doubles Down" and their hand tally stands short of the Dealer's hand tally outcome.

THEN: The Player(s) are "Sacked," and LOSE.

SO: The Player(s) lose: 100% of their *total* contract wager. Player(s) are "Busted," and LOSE over 21.

*NO DEALER'S HAND IS IN PLAY*

*OPTIONAL MERCY SAFTY NETS for POWER PARLAY™ PLAY ACTIONS:*
POWER PARLAY BLACKJACKS™; POWER 20™ & POWER ACES™ HANDS

*OPITONAL DIFFERENTIAL "SHORT-WIN" NUMBER IN PLAY ACTION IS: 19*

*OPITONAL DIFFERENTIAL "PUSH" NUMBER IN PLAY ACTION IS: 18*

*OPTIONAL DIFFERENTIAL "MERCY" NUMBER(S) IN PLAY ACTION IS: 17*

*(CONTINUED IN FIG. 9c)*

*PLAYER'S "POWER PARLAY BLACKJACK™" HANDS:*

IF: A Player draws a Blackjack upon first Two (2) cards, they Win out right, and are paid off...
The Player can stop their play for the hand right here, or they can make a Parlay play.

THEN: Player(s) can rebook; via, a new Split & Increase option, on one or both, new Ace & Ten card hands.
Drawing One (1) card for each immediate replay hand.

SO: Player(s) are allowed up to a new Triple Down wager for each hand's "Parlay play action."

*PLAYER'S "POWER PARLAY 20™" HANDS:*

IF: A Player draws a two-card Twenty/20 upon their initial hole-count hand.

THEN: Player(s) MAY have option, to take a "Winning Even Money" payment, and then
rebook new "reciprocal" wagers, upon both new Ten count hands.
Drawing One (1) card for each immediate replay hand.

SO: Player(s) are allowed up to a new Triple Down wager for each hand's "Parlay play action."

*PLAYER'S "POWER ACES™" HANDS:*

IF: A Player draws a two Aces upon their initial hole-count hand.

THEN: Player(s) MAY have option, to rebook two new wagers, upon both Ace count hands.
Drawing One (1) card for each immediate replay hand.

SO: Player(s) are allowed up to a new Triple Down wager for each hand's "Parlay play action."

*PLAYER'S "WINNING" HAND TALLY'S:*

IF: A Player draws to an outcome hand of: a repeat TWENTY, TWENTY-ONE and/or a repeat BLACKJACK.

THEN: The Player(s) are automatic "Winners again."

SO: The Player(s) are paid: At least, EVEN MONEY on 20 & 21 outcomes.
While all repeating "BLACKJACKS" are paid, at least: 3 to 2.

*PLAYER'S OPTIONAL "SHORT-WIN" NUMBER HAND TALLY:*

IF: A Player draws to an outcome hand of say: NINETEEN.

THEN: The Player(s) outcome is a possible "Short-win."

SO: The Player(s) are paid: LESS than 100% of their full combined contracted wager.

*PLAYER'S OPTIONAL "PUSH" NUMBER HAND TALLY:*

IF: A Player draws to an outcome hand of say: EIGHTEEN or NINETEEN.

THEN: The Player(s) outcome is a possible "Push-play."

SO: The Player(s) don't win or lose.

*Fig. 9c*

*PLAYER'S OPTIONAL "MERCY" NUMBER(S) AND "LOSING" HAND TALLY'S:*

IF: A Player draws to an outcome hand of say: SEVENTEEN, EIGHTEEN OR, NINETEEN.

THEN: The Player(s) is given some MERCY, and keeps "HALF" of their Entire Wager at play.

SO: When a Player(s) hand tally "stands short" of the first: short-Win, Push and/or Mercy Number(s)
being used; such hand(s) are "Sacked," and lose. Player(s) are also "Busted" over 21.

PARLAY BLACKJACK PROPOSITIONS AND COMMUNITY SIDE-BETS

CROSS-REFERENCE TO RELATED APPLICATIONS

This is a Continuation-in-part of: U.S. Pat. No. 9,370,709 filed; 13 Sep. 2013.

That is a Continuation-in-part of: U.S. Pat. No. 8,747,203 filed; 7 Jan. 2011

That is a Continuation-in-part of: U.S. Pat. No. 8,308,540 filed; 13 Apr. 2010.

TRADEMARK NOTIFICATIONS

This application contains several Trademarks for which the Applicants maintain their exclusive rights, to usage thereof.

FIELD OF INVENTION

This invention relates to games of chance as historically identified with wagering in casinos.

The Applicants' methods and modifications are inclusive to both a variety of live action table gaming formats as well as electronic display applications for play of all types. Their inventive process utilizes both Standard decks of Fifty-two (52) cards, or any of several differing types of acceptably configured decks, such as; over Fifty-two cards (Jokers included) as well as under Fifty-two cards (a.k.a., Carnival or Spanish decks, etc.) with or without Joker cards being added and/or the electronic simulation of all the like, to be specific. By definition, such deck are "modified decks."

Indeed, the Applicants' processes in allowing Housemasters (i.e. casino management) the ability to apply such a variety of decks is for the direct purpose of; expanding, contracting, and/or otherwise manipulating the core operating margin variances from the usage of such decks, as utilized in their applied methodology, thereby establishing this Ful' Monti™ affect for Blackjack.

Furthermore, said Applicants' processes for play will often include a simple modification being made to a traditional Blackjack game already operating in commerce. The Applicants' applied means for the provision of play, extends to rudimentary rule changes being applied, followed by a very simplistic Dealer process modification in regards to the handling of initial Hole-count. Blackjack hands and their aftermaths most specifically, other modifications identified herein below, may apply.

Presently, the Applicants know of no previously established methodologies regarding either "live action" table game embodiments of Blackjack including those banked by a House (casino) or electronic "virtual reality" card dealing display methods of Blackjack/21, either with or without Dealers, which are presently under Patent enforcement or otherwise, that might be construed as specifically teaching on, or reading upon, their concepts and processes as being utilized in play.

DESCRIPTION OF PRIOR ART

Blackjack is a premier table game in American casinos as well as casinos across the world. No doubt there is good reason for this. America and the world love card games, and they know this game: Blackjack! Actually, it's a love/hate relationship; just ask anyone who plays the game. People love to play Blackjack especially when the cards give, and of course take.

However, before the further disclosure of the Applicants' alternative Replay, and after-the-fact/mid-hand entry Community Ante-up Side-bet methodologies are revealed and developed, a brief discussion regarding Blackjack's traditional play along with some terminology and historical factors are useful in teaching the Applicants' inventive processes, as described and illustrated herein.

Simply put, the objective in traditional Blackjack is to beat the Dealer's hand. This is accomplished by acquiring a totality of cards that tally higher than the Dealer's cards without going over Twenty-one (21), for any given hand at play. The card values in Blackjack are as follows: Cards Two (2) through Ten (10) are tallied at face value while "face cards" are valued at Ten (10) and Aces are valued at Eleven (11) or One (1).

Henceforth, the term "Ten card" will define both Ten (10) cards and/or Jack, Queen & King cards (a.k.a., Court cards). Similarly, a "Blackjack" hand is always made up of the first two-cards dealt; meaning, a Ten card and an Ace.

The Blackjack hand is also referred to as a "Natural" or when made with Three (3) or more cards a "21," and is just as generally unbeatable. Although, the dirty little fact of the game is that a Dealer's dealt Blackjack hand will often drive a simultaneously dealt Player's Blackjack hand into an even money decision or at the very least, a Push stand-off for the Player's hand; meaning, the Player's hand doesn't win or lose.

Likewise, a Dealer hand Twenty-one (21) made with Three (3) or more cards always Push/Tie all other Player hand Twenty-one's (21's) made with Three (3) or more cards. As a practical matter, a Player can win with any total under Twenty-one (21) so long as the Dealer either "Busts" first, or the Player's hand-count(s) finish higher.

Busting in Blackjack is any final tally higher than Twenty-one (21) for either the Player's or the Dealer's hand. Yet, unlike the Dealer, Players will experience the "Double Bust." The Double Bust occurs when Players Bust-out first, followed by the Dealer Busting.

It is this constant reality of the Double Bust, which Players are intractably facing in Blackjack that gives the casino its greatest most frequently exercised "House Percentage Advantage" (a.k.a., Vigorish or "Vig.") over the Players. It is said that the Dealer will Bust 28% of the time however, only the Players can experience the Double Bust, because the Player must act first!

All things considered, Double Busting provides the House with a constant 5.7% advantage over the Players when Double Busting occurs. Therefore, any way you play it within the confines of all traditional Dealer hand methods and rules for playing Blackjack, there remains a powerful House advantage being exacted against all Players within the traditional rules of Blackjack, which must be constantly evaded. This House advantage is the Double Bust effect.

Additional aspects of traditional Blackjack play include the terminology of "Hard," "Stiff," "Soft" and "Pat" hands. A Hard hand is one that either does not have an Ace 9-7/16; or, if it does, it tallies as a One (1), 9-6-A/16. Typically, the Hard-hand totals of Twelve (12) to Sixteen (16) are also called "Stiff hands" because such hands can easily Bust when drawing the very next card.

A "Soft hand" is one that has an Ace being tallied as Eleven (11) amongst the first Two (2) cards being dealt: A-6/17, A-7/18, A-8/19 or A-9/20. Regardless whether the Player's hand stands made upon a Hard or Soft 17, 18, 19 or 20, such hands are thought of as "Pat hands."

The last two general strategies of traditional Blackjack play include card "Splitting" and/or "Doubling Down," both practices of which Players are well advised to partake of, though tableside restrictions will vary from House to House. Most often, when Players engage the practice of card Splitting & Doubling down, the decision is simply weighed against the Dealer's "up-card."

Should the Dealer's up-card be a Bust card 2, 3, 4, 5 or 6 this often inclines the Player to Split their paired cards such as 2's, 3's, 4's-6's, 7's, 8's, 9's or Aces, when they otherwise may not.

This scenario facilitates a great Splitting opportunity or better yet, as paired Aces reveal, a fantastic multiple Double Down action against a Dealer's weak up-card, although Players may draw out as many cards as necessary in a normal card Splitting situation until they either Stand Pat or Bust! Similarly, when Splitting Aces many casinos allow only One (1) card for each Split Ace.

In further regard to Doubling Down, again it's a good idea to Double Down whenever the opportunity arises, although Doubling Down is sometimes restricted to a Player's first Two (2) cards tallying Ten (10) or Eleven (11) only. Moreover, several restrictive rules pertaining to Splitting & Doubling Down, are put into place by Housemasters (casino management) as a means to maintain "a desired core operating margin position" for their Blackjack games, therein benefiting their casinos. Therefore, these rules will vary based on subserviently subjective factors. Additional subservient factors are found within the "Insurance & Surrender" rules, as historically applied.

Traditionally, Insurance is offered when the Dealer's up-card is an Ace. For the unwashed, Insurance is generally thought of as a "bad bet;" yet, it does protect/advance the Player's wager in the event the Dealer has Blackjack with a Ten (10) hole card.

As for the traditional practice of the Surrender rule option (either early or late Surrender, and where it is still found), this rule enables the Player to withdraw from the hand for half the original contract wager. This action is taken by Player(s) when it's felt the Dealer's hand is so strong (often repeating up-card Tens & Aces), that keeping half the original contract wager is clearly better than losing all of it.

In America today and throughout the world, Insurance is readily found as part of the Blackjack gaming scene where Surrender rules are not so readily found outside of Asia and Europe.

The reasons are simple, Insurance is generally thought of as a bad wager for Players to engage in while Surrendering against continually "strong" Dealer hand up-cards, in a few cases, is a good idea.

Of course, the Surrender action as historically deployed assumes the Player is not motivated to just simply get up and leave . . . . The above background rendering of traditional Blackjack rule play pretty much covers all the essential bases of Blackjack play, however certainly not all the "Basics" of Blackjack play.

As such, the Applicants are referring to the qualities of play employed through the application of competent "Basic Strategy" play, and the much more elusive "Advanced Strategy" play (a.k.a., Advantage Play, Advantage Player or AP).

Additionally, within the bounds of traditional Blackjack's Basic Strategy, as written about in so many books on topic, there lies a most critical body of knowledge for which the Player must acquire an a fortiori logic to win.

This competency of logic is regarding the speculative business of card counting as well as a cultivated knowledge of why & when to execute play action Ante wager Side-bets; that can also prove constructive, in the acquisition of more winning sessions rather than losing sessions at Blackjack. Notwithstanding, other advantage techniques; like hole-carding, shuffle-tracking & various camo-play actions of which for the sake of brevity, the Applicants will pass over such details for now . . . .

SUMMARY OF THE INVENTION

As will become quite clear, the Applicants are proffering a new play action model for Blackjack. This model is to be applied to, and is adaptable for play upon, any existing traditional "Blackjack" game or any of the Applicants' proprietary methods using at least a standard Fifty-Two (52) card deck, or that of modified decks.

Wherefore, the Applicants are now disclosing their newest proprietary compilation of compounding Bonus Replays, along with their tag-along Ante-up wagers.

Indeed, the Applicants' are projecting this compilation of wagers, starting from any Player's initial hole-count Blackjack win, as first tempted, then induced, by the "splitting replay" of said first winning Blackjack's Ten & Ace valued cards thereof, into what is possibly, a "twin-win" of hands, plus their Ante-ups, engaging this "Parlay event."

This is called a Parlay-Split; because, at a minimum, it's a "replay action" beginning from either suited, or off-suited Ten/Ace cards. Alternatively, the Player may also replay their Parlay Blackjack™ hand, as a single restarting hand of Eleven (11), under this guidance too, however no Side-bets are likely to be offered for this type of Parlay event. How to Play: After the payoff of a first winning Blackjack, the Player may begin their Parlay action, by first increasing the base value of each new wager. Next, the Player may elect to engage one of the Community Side-betting Ante-up wagers being affiliated with this "Parlay-Split" event, and then draw their cards, to complete their play.

The presently illustrated Community Side-bet wagers are called: the "Hat-Trick" and, the more difficult to achieve: "Shoot-the-Moon" Ante-ups.

Both wagers are often played together, and are after-the-fact or mid-handed entry in nature, and Community in there access for Players, behaving as compendium plays in direct support of ANY subsequent Parlaying Blackjack hands showing, during any round of play action. Likewise, as Players draw to new Blackjack hands, a new Parlaying event option becomes initiated both for, and by them; thereby providing, the catalyst required for advancing these new after-the-fact Community Ante-ups for not only themselves, but for all Players who wish to engage the process, during said round of play. This play action will be occurring frequently!

Although, utilizing some acquired functionality from the disclosures being made from within earlier Parent files; this now differing, yet transiently applied adaptation IS for expanding a new wagering scheme, as a means for action, regarding all existing Blackjack games occurring anywhere.

First, such capabilities, do in fact reinvigorate "existing Blackjack games" in very defining ways; via, the exploitation of previously unforeseen efficiencies, as now being overlayed upon, and directly affiliating with, a traditional game's mathematical methodologies and processes.

And second, these play action efficiencies as applied; via, the plug & play nature of component-process-rule-changes, as then carefully balanced for Parlaying hole-count Blackjack hands, or the like; does provide for the means to deploy these newly arrived at mid-hand entry Community-based Side-betting wagers that function to so ameliorate further Player participation. This is what further allows all Players to participate in as many Blackjack hand/events as showing in play, whether or not the Player themselves are receiving their own share of Blackjack hands during any given period of play.

Moreover, whether with or without, a mid-hand entry Ante-up requirement being applied just prior to the Parlaying possibility of a hand, or whether said Parlay play is conveyed with a commissionable percentage rake being applied to such winning wagers post-up to the hand's completion in play; the certain process for wagering upon someone else's Parlaying Blackjack hand while in progress, will necessarily conjure-up an "Ante-up, 'pay-to-play for access to such Community Side-bets,' by any and all Players who so wish to play into these types of Community Side-betting events, as they occur." How? Players simply elect at will, to play through the now organized for Secondaries . . . .

Or, Players learn to compound their access too winning, via the Community plays.

In so doing, a Player's first blind-hole-count Blackjack is paid-off, at least even money. Wherefore then, the Player conveys to the Dealer their option to move outright away from play against the Dealer's hand into a Parlaying action for the further resolution of their hand's play.

The function of Splitting and re-playing their present Ace/Ten cards making up the Player's first Blackjack hand, is too then, rewager both the Ten (10) & Eleven (11) count cards as two (2) separately played new hands, and therein play through into a finishing of the extended Parlay Blackjack play action by drawing at least One (1) new card for each of the new hand(s) in play.

As a direct consequence of this expanded wagering process, the results of these new wagers are now anticipated for, and paid-off through the "scale of a Propositions type equasion," having its means for play, being first addressed and accessed, by way of the customary Split-hand training for which Dealer's are afforded, and Players are most familiar, and further, as typically stated and engaged upon the gaming table's surface, rack cards or through the electronic equivalence of their tutorials.

Moreover, as implied by the terms "after-the-fact, mid-hand entry and Community;" these are additionally optional Side-betting wagers working in tandem with any and all Parlaying Blackjack hands, and possibly with both hole-count Two-card/20's & paired Aces a.k.a., the Power 20™ & Power Aces™ hand events too; as happening, for one, or even several consecutive Players, within there order of play, during any given round of play.

So then, the Parlaying Blackjack means begins with the first Blind Blackjack event drawing in-the-hole for any given Player or Players, during any given round of action. Upon pursuit of such Parlay action, the Player is first paid for their blind-Blackjack's first winning draw in-the-hole.

Where again next, after the initial payoff, the Player who is opting to continue this optional play will frequently have the Dealer Split the two (2) cards continuing the first win, into two (2) new hands.

Then, the Player will have option to rewager upon the two (2) new hands, before drawing cards. However, before the Player draws their typically One (1) new card for each new hand, this Player as well as any other Player(s) watching or playing the round, will have the means to wager upon the a likelyhood of the Player's ability too draw to, two (2) new Blackjack hands or even to, two new Two-card/20 hands for one or both hands as newly Parlayed outcome(s). Both, are winners!

Additionally affecting the Players of the Applicants' methodology herein, is the wholly optional impact of the composite of differing deck types, and/or shoe configurations, capable of being offered and applied during the game's play.

Such specialized deck configurations comport very well into the Applicants' broader processes for play action; via, the dynamics of their new proprietary Parlay event(s) as being simultaneously assimilated along with "the new Community Ante-up Side-betting options" which are also, being designated as "after-the-fact" Community Side-bets, as just outlined above.

Another way of understanding the Applicants' "mid-hand entry" processes for Side-betting, is that "Players are typically 'not seeing' their first two-cards" when making a decision to book a Side-bet. Historically, the process for booking Ante-up Side-betting wagers; is to act prior, to drawing their first two-cards in play action.

Certainly, not "after" seeing their first two-cards in play action . . . .

Similarly, as has been taught, there exists many possible play action embodiments for culminating the Applicants' gaming modifications that are applicable, especially as applied into programmable electronic devices, yet only one discussion of these embodiments in counsel form is cited below for development of such applications, serving as the necessary disclosure hereto.

OBJECTIVES AND ADVANTAGES

Traditional Blackjack is the most quintessential table game encompassing the psyche of the world's casino going experience. This is true even if you don't play the game. Almost nowhere, save for Macau & Monte Carlo, will you go into a casino and not find Blackjack front and center to the table gaming action!

Accordingly, several objectives and advantages are clearly achieved by way of the Applicants' applied Blackjack methodology model, wherein having their unique menu of higher stakes Proposition(s) and Community Side-betting action(s) coalescing onto the center stage of Blackjack's classic play, as is made via their proprietary means, moving forward.

Therefore, with the booking of a contract wager, all Players are dealt Two (2) cards up or down while the Dealer receives one card up, and one card down.

The starting with the person sitting at first base on the table, each Player seeing the value of their present Two (2) card tally, along with the Dealer's up-card, have fast decisions to make. Do they "Surrender," "Draw-card(s)," "Stand-Pat," "Double Down" and/or "Split" their cards, including Splitting their cards for Double Down play action(s) against the Dealer's possible final standing hand count? All of these options, begin as Primary play actions, then frequently advance into Secondary play action(s).

The Secondary play actions are defined as any hand for which an increase to the originally wagered amount is being made; as such, Doubling Down against the Dealer's hand, or as Parlaying alternative Multi-Down wagers into a Propositions paytable scheme is the next order of mathematical decision-making, being played. In actual play action, several Secondary wager(s) will play into an alternate-Proposition means for payoff; not as play actions against the established Dealer's hand in play.

But rather, the Parlay Blackjack and/or other plays, that deploy; via a Propositions' type paytable(s), and are marked as such, as readily identifiable upon any game table layout offering these types of wager(s) whereby exposing such wagers and completed hand count tallies to a very swift play action process!

Again, in most circumstances, the Applicants' menu of Secondary play options function like this: The Player evaluates his hand's options for overall play. Once the Player concludes that a Parlaying action upon a standing Blackjack hand, a Two-card/20 hand or a hand of paired Aces in-the-hole for that matter is a wise one; the transition of the Player's contiguious play, moves into an alternative relationship within a fixed Proposition's type, and status of means & methods for its payoff conditions . . . .

So, the Dealer in order of turn, then recognizes the Player's desire to Parlay, and transition from traditional play against the Dealer's hand, to re-route, rebook and finalize to completion the Player's hand; via the Propositions model for pursuit of this Player's action, while all being done by qualified Players; and all prior to, the Dealer revealing their "Hole-card" to ANY Player(s), playing in the hand or round of action.

Although, regarding hole-count Blackjack's, these Ace-Ten hands do start as automatic wins wherefore the Secondary action being offered therefrom, is always an at will; bonus option replay. As Such, a rebooking, rewagering replay of the Player's Blackjack hand, for example; via the individual replaying of their Ten (10) & Eleven (11) count card(s), then occurs. Most importantly, these hands are susceptible to becoming at least, "Triple-net" replay actions (Triple Downs) prior to drawing their typically One (1) new card allowed per hand, thereby completing play.

Additionally, regarding any new "hole-count Two-card/20 hands," these hands too, can play straight-up against the Dealer's hand in play as traditionally done, or they too, can be co-opted into two (2) new Ten (10) count hands as Parlay actions should Housemasters, so allow for.

However, unlike hole-count Blackjack hands, they will NOT necessarily first begin with a payoff of their initial Two-card Twenty (20) hand status, having already been drawn.

Furthermore, unlike the Blackjack Parlay play, if the Player is PAID for their Two card Twenty (20) hand in-the-hole, then the Player MUST reciprocate by Splitting and re-playing the two Ten (10) count cards individually, as it's no longer an optional play. The Players can also Double or Triple Down upon their originally contract wager here as well, while they MAY also be enjoying the Mercy of a safety-net, whereby keeping HALF of their compounded wagers when standing, upon final outcomes of say, at least a Nineteen (19).

Moreover, should a Player elect to play straight-up against the Dealer's hand, this is still a time honored option for playing a hole-count Twenty (20) hand. Although, a most enticing NEW decision for the Player is the ongoing attraction to the thrilling experience of winning twin Parlayed hands, as weighed against a similar degree of risk exposure that is endured, to win say; two (2) consecutive Split Double Downs, and still; without the need to beat the Dealer's hand to boot!

Without a doubt, it becomes an obvious risk to take! Given the possible, "Mercy of a Safety-net" and especially since; finishing, with a new Blackjack outcome upon either or both hand(s), in this play action, can pay the bonus of: 3 to 2, upon wager(s) having likely been raised, to a Triple-net basis!

Why? First, if we are to accept the notion that essentially no one who is contemplating a traditional Double Down action is drawing for less than an outcome of Twenty (20), and preferably an outcome of Twenty-One (21); which is, a "rather universal truth" about taking such an action, then we can begin to see the equation rational take shape.

Afterall, who's hoping to draw to a 19, or even less against the Dealer's hand, right?

And, most importantly, remember:

THE PLAYER DOES NOT NEED TO STILL BEAT THE DEALER'S HAND!

Moreover second, as the Player sits with Ten (10) or Eleven (11) count hand(s), looking to achieve an outcome of Twenty (20) or Twenty-One (21) with their very next card, there lies Five (5) ways to acquire either outcome drawing from a Ten (10) count tally; those being 10, J, Q, K & Ace. And, similarly, from the Eleven (11) count tally; a 9, 10, J, Q & K does the job.

Furthermore, when Splitting paired Ten-cards, Aces & Ace/Ten hands, "Ten-cards" are what's being sought! All the while, fighting Eight (8) ways of missing such outcomes, which are all the other cards.

Voila! The simple minded "8 to 5" relationship to the cards, appears.

As a purely practical matter, the average Player utilizing this lazy rule of thumb will consider these Parlaying activities as 8 to 5 probability considerations. All the while of course, better Players will know these opportunities to Parlay Blackjack hands, Two-card/20 hands, and even paired Aces as far better or far worse than 8 to 5 probabilities according to their "count" at the moment . . . .

Again, as is the case with the customary procedure for Doubling Down, lessor Player's are faced with a significant consequence when booking into this tacitly "8 to 5" probability assumption/equation followed up by the often at least "2 to 1" probability against drawing the typically sought after Ten-card(s) needed for winning such Parlayed wagers, now ×2 hands, when drawing upon any Split; hole-count paired Aces, Two-card/20's or initial winning Blackjack hands.

Therefore in reprise, upon pursuit of such Parlaying actions, the Player is paid for their first winning Blackjack drawn in-the-hole however, Players Parlaying hands of; Two-card/20's or paired Aces, will likely NOT necessarily be paid-off first, as hole-count 20's and certainly paired Aces, will NOT typically be viewed as, nor begin as, automatic winners like the initial Blackjack hand does . . . . Housemasters, MAY also allow Community play actions upon ANY type of Parlaying event(s). Meaning Housemasters, could allow those Community Side-bets of: the Hat Trick, or even the Shoot-the-Moon wagers, as active Community play options for all types of Parlayable hands.

Again, as implied by the term "Community," these additional Side-betting wagers may work in tandem for more than Blackjack hands. Two-card/20's, and paired Aces too, might be inclusive for either one or several consecutive Players, in there order of play, during any given round of play. Next, the Player who is opting to continue this play will have the Dealer Split the two (2) cards perpetuating the first winning Blackjack or the splitable Two-card/20 and/or paired Aces hand into two (2) new hands.

Then, the Player will have option to rewager upon the two (2) new hands; via the aforementioned methods before drawing cards. However, as for the after-the-fact Community Side-bet options, the Two-card/20 and/or paired Aces as split, MAY NOT be afforded any more than the "Hat Trick" option for its Community play action payoff.

Likewise, all types of Parlayed hands MAY enjoy the benefits of the Mercy safety-net, and the values of the Community Side-bet/Ante-up wagers being made simultaneously within each of the Parlay action(s), as they happen.

Additionally affecting the Players of the Applicants' methodology herein, is the wholly optional impact of the composite of differing deck types, and/or shoe configurations, capable of being offered and applied during the game's play. Historically, these optional deck configurations have been simply identified as: "Modified decks."

Insofar, as a Standard Fifty-two (52) card deck is used, an operative "House-Advantage" edge or 1-1A, of "X" percentage value in the margin exists, while the card configuration of say a Carnival deck configuration having Fifty (50) cards in play would represent a: "Y" HA, or Vig-margin value. Further still, a Spanish configured deck with Forty-eight (48) cards in play offers even yet, a more generous Vig-margin affect of: "Z" percentage value in margin, as all presently given example.

In play action support of the Applicants' methods, such deck configurations provide deepening degrees of core margin relief, for the House's use; along with differing wagers being first offered, then orcastrated; via the Applicants' finely tuned proprietary rules application with there powerful Vig-advantage result, being exacted from each "X, Y or Z" solution, of "applicable deck options" being used in play. By way of even further extention, the Carnival and/or Spanish deck types being applied to the Applicants' play action methods also defines Carnival decks as having either their "Red or Black" Ten (10) Pip-cards removed, with the two Joker cards being put in as replacements for example, whereby enlisting a wide degree of valuation, (i.e. deployment & redemption applications) an purpose (i.e. application to the game and/or special marketing tools for the sponsoring casino) for such Joker cards, being applied. Similarly, Housemasters might simply elect to remove the red or black Ten (10) Pip-cards alone, without Joker replacements.

Likewise, the "Spanish-type" decks by definition have all four Ten (10) Pip-cards removed from play action; with the use of Joker cards, being strictly another option.

However, before the Player draws their typically One (1) new card for each new hand, this Player as well as any others watching or playing the round, will have the means to wager upon such a Player's ability to draw too; two (2) new Blackjack hands, two (2) new Two-card/20 hands a.k.a., Power 20™ hand or, even the two (2) Paired-Aces hand a.k.a., Power Aces™ hand, drawing to: 20 or 21, for the Win! Albeit, a Player's natural desire is to score repeating Blackjack events, paying: 3 to 2, upon both hand's at play. However, this is only one form of win for a Parlaying Blackjack event. Of course, another is: "Shooting-the-Moon" whereupon, a BIG payoff of "X to 1," would be the very special payoff for those who "Anted-up" for that outcome play too.

In reference: The other two winning outcomes are considerably easier to achieve.

Why? This is because the Player only has to achieve a final draw-count of "Twenty (20)" for One (1) or even both, Parlaying hand events, instead of TWO repeating Blackjacks. This easier to achieve Side-bet event and outcome is called: the "Hat Trick," and is paying: "Y to 1," for that reason . . . .

The Community Side-Bet outcomes of the "Hat Trick" and/or the "Shoot-the-Moon" Antes, are always pay-to-play outcomes . . . . Furthermore, additional "Ante" type paytables may well be offered to accommodate suited or multi-suited outcomes for ALL of the above aforementioned wagers.

In further support of the Propositions aspect of the Parlay process, and as already dipicted from above; once the actual Player declares to make a Parlay wager, they will be enjoying an added motivation to access this play action for which the Community Ante-bet Players will not receive.

As such, this motivation comes in two forms, first the ability to increase the two (2) new wagers from their originally contracted sums. And, in doing so, an original $10.00 wager can now become Two (2) new $30.00 wagering events, for example.

And second, the Player might enjoy the Mercy safety-net, in the sense that either or both new hands could experience the "Mercy of keeping HALF of a hand's total combined wagers" upon the standing outcome of say, at least, Nineteen (19) while winning at least "Even Money" upon any outcome of Twenty (20), and typically catching a: 3 to 2 bonus payoff, upon any repeating Blackjack for either or both wagers of a Parlay Blackjack hand's event, more specifically.

Even as already directly stated, this process is repeated for each, and any Player expecting to plug-in, and complete either or both types of Parlay/Ante-up wagers, before the Dealer reveals their "Hole" card, whereby the customary process for play action still remaining for those Players NOT engaged in their own "Parlay event" are brought to a resolution through the "revealing" of the Dealer's "Hole" card, followed by the traditional process and manner for completing the round.

As such, the Applicants' unique methodology provides for utilizing at least, a Standard deck of cards that directly originates, and then projects many of the Applicants' methodology features and benefits, from its core mathematical mechanics for play, while still providing for all the necessary elements of a sustainable addition to the classic Blackjack workhorse for which the public will enthusiastically embrace.

Furthermore, it is the principle objective of the present methodology model to provide a wholly new gaining process and dynamic, while requiring only routine mental focus to enjoy a seamlessly familiar playing experience.

It is another principle objective of the present methodology model to provide a wholly new paradigm of thought provoking play that competently coincides with accepted mathematical mechanics and procedures regarding applied probabilities of chance projecting from the applied integrated core resource of first the cards along with their shuffle mix dynamic, their play action distribution, and then their actual assimilating engagement to the rules of play.

It is still another principle objective of the present methodology model to provide for the application of a number of acceptably configured decks of cards or the electronic representation thereof, be they Standardized, Carnival or Spanish decks which can include the usage of Joker cards during their composite revelation to Players, for which application thereof, provides a certain degree of mathematical volatility and value, being built into the basic functions of the game whereby Housemasters can apply many differing types of wagers and methods; including Joker card deployments, redemptions and payoff regimes with their corresponding rules and consequences.

It is yet another principle objective of the present methodology model to provide for the proprietary adaptation of a Secondary Multi-Down wagering process for play action; via the means of a Proposition's process whereby Parlaying wagers are rebooked and ensued to completion; before the Dealer reveals their own hole-card to Players, during the course of finalizing the round.

It is still yet another principle objective of the present methodology model to provide for the additional proprietary means of a Secondary Proposition type Multi-Down play action event; inclusive to the Parlaying of an initially won Blackjack hand, whereby the Player(s) then enter a unique Parlay process by first, Splitting and then rewagering upon, the now two (2) new hands, according to said hand's "initially contracted amount" of its opening wager which further and purposely expands the game's volitility for this play's action.

It is still yet another principle objective of the present methodology model to provide for the additional proprietary means of a Secondary Proposition type Multi-Down play action event; inclusive to the play actions of initially drawn hole-count Twenty (20) hands and/or initially drawn paired Aces, whereby the Player(s) then enter a unique Parlay process by first Splitting and then rewagering upon the now two (2) new hands, according to said hand's "initially contracted amount" of its opening wager which further expands the game's volitility within these types play of actions.

It is still yet another principle objective of the present methodology model to provide for the added proprietary means of a "Mercy safety-net" adaptation, for taking "only a portion" of the Player's total combined wager, upon standing Parlayed hand-counts of at least, Nineteen (19) being applied to concurrent play action of any Secondary Proposition Parlaying event, as a means to "ameliorate a degree of risk," whereby inducing a better Player participation.

It is yet another principle objective of the present methodology model to provide for the proprietary means of an after-the-fact mid-hand entry Community Side-betting process for play action; via either a Player's own Proposition's play action, or as the term "Community" defines, as a means for OTHER Players to tag-along-in-play with said Player(s) Parlay action, and whereby such Ante-up type wagers are booked and ensued to completion upon each and ANY Player's Parlay hand's action, during the course of finalizing any such play through each and any round of play for the game.

It is yet still another principle objective of the present methodology model to provide for the proprietary means of at least two Ante-up type, Community Side-bets for play action; engaging either a Hat-Trick method of play action or a Shoot-the-Moon method of play action, whereby the Hat-Trick method equates to repeating outcomes of at least, finalized hand-counts of Twenty (20). Whereas, the Shoot-the-Moon wagering methodology, will equate to two (2) repeating Blackjack, or Twenty-One (21), outcomes finalizing said Player's hand, during each and any round of play. Likewise, the play action pay tables being utilized, may well accommodate matched & suited outcomes as well. Another consideration regarding the Applicants' Blackjack methodology model is to make their gaming modifications available for application into an encompassing array of third party computing apparatuses, utilizing programmable electronics and video display devices, and/or third party hand held or otherwise wireless devices, for distribution of their Proprietary methodologies across suitable LAN's and/or WAN's, or the like (not shown).

DESCRIPTION OF DRAWINGS

The foregoing features, advantages and other objectives of the Applicants' methodologies and modifications will become even more clearly understood from the following flow of decision chart embodiments for progressive events; as taken in conjunction with the accompanying "description of counsel" (rules and play options) encompassing any Table gaming and/or Programmable Electronic video or wireless gaming display apparatuses being applied for the same.

FIGS. 9*a*, 9*b* & 9*c* Shows an exemplary counsel embodiment along with its payoffs.

A DETAILED DESCRIPTION OF AN EXEMPLARY EMBODIMENT

Figure 1:
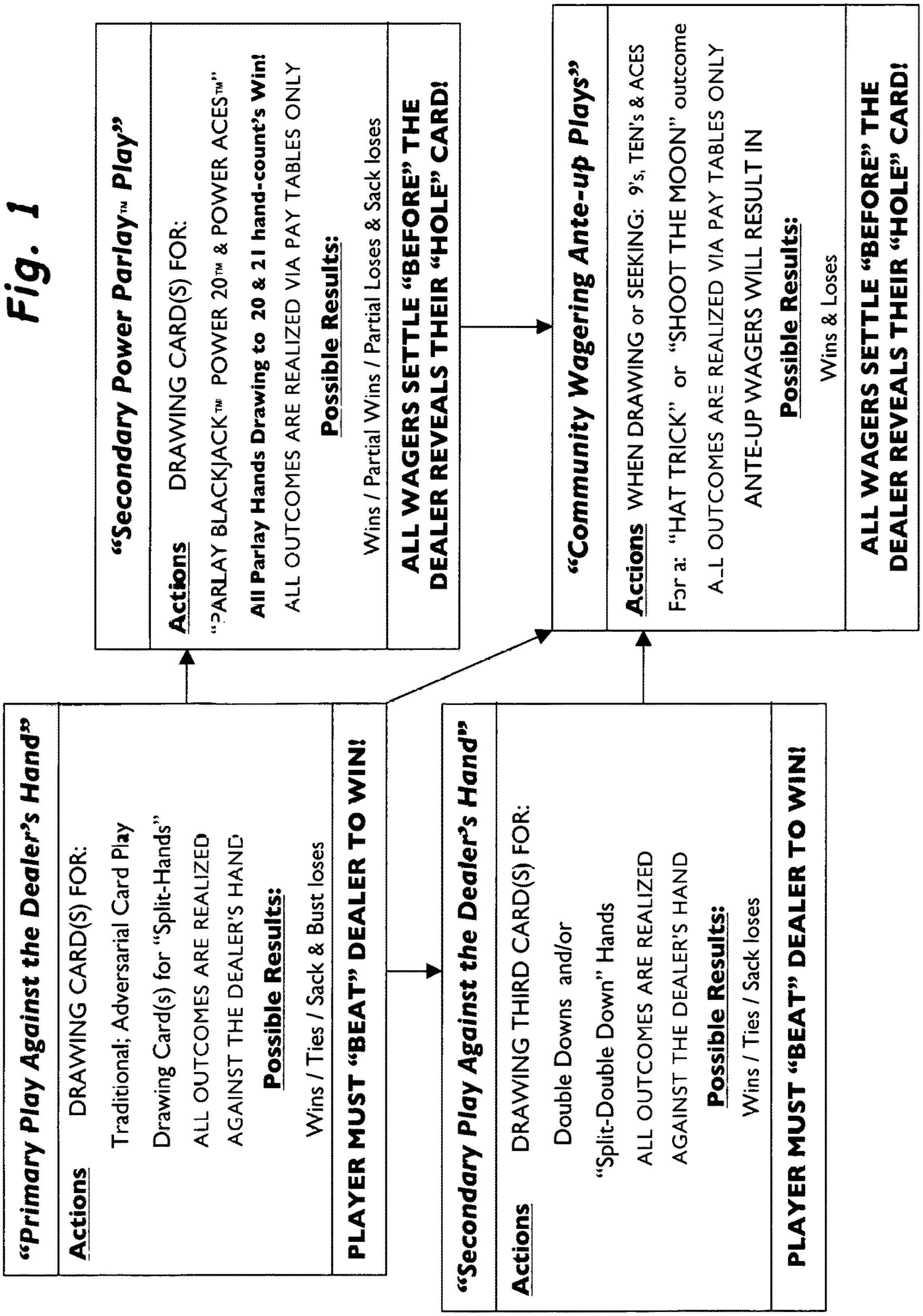
FIG. 1 Shows the Primary, Secondary or Ante-up decision points for the game.

In referring to the drawings as illustrated, it shall be understood that the combined entities of FIGS. 1 through 9*c* inclusively, are establishing an expanded exemplary embodiment for the game of Blackjack at large, through which the Applicants are further disclosing their unique, systematic means for deploying; a "Parlay Blackjack™ proposition wager, along with its additional 'Community style Ante-up' Side-Bets; those bets being, the 'Hat Trick & Shoot-the-Moon' wagers."

Furthermore, the unique wagering actions of the Applicants' "Parlay Blackjack™" style of proposition wager(s) are compounding in two key ways. First, via actual increases being made to the wager. And second, via the utilization of the various deck configurations being used in play.

In so doing, these two factors contribute directly; to the "core mathematical calculus" of the Applicants' methodologies in play. However, the coalescing influences of the Applicants' newest "Community Ante-up" Side-betting wagers DO NOT operate in the same vein of mathematics! Albeit, while these wagers do work together, their mathematical mechanics are simply dissimilar.

This is not to say that the functional mathematics of the "Ante-up" wagers are uneffected by deck configurations, because they most certainly are. However, it's just a separate mathematical consideration being applied here.

These differences, pertain to all traditional variations for Blackjack's play which are all mimicked on the front-end-start of the Applicants' methodology model, prior to the Player being enticed with what are either "Split Parlay hands or then, Ante-up Side-bet decisions." Because now, every Player thereof, can now experience what is at least one, of at least two, applied means for significantly increasing their repetitious exposure to a clear multiple of Blackjack hands, per round of play.

Profoundly, this is whether said Player's are receiving their perceived share of Blackjack hands, or merely playing-off the opportunistic hand's of others!

This is, a historically unprecedented paradigm shift, greatly benefiting Blackjack's operational botomline as a premier casino game, moving forward. Likewise, the optional means for a Player's access to a "Mercy safety-net" adaptation, working as an additional component agent being applied inclusive with the proviso; of either, a short-Win, Push play or for the loss of "only a portion" of the Player's total combined wager when standing upon a hand-count of say, at least Nineteen (19).

Moreover, the entirety of the Applicants' methods are applicable to live action play, wireless communications of all kinds, mobile-internet devices, electronic video and/or otherwise utilized by, any of the many, customary avenues of adaptation for such games in uses today . . . .

Figure 2:
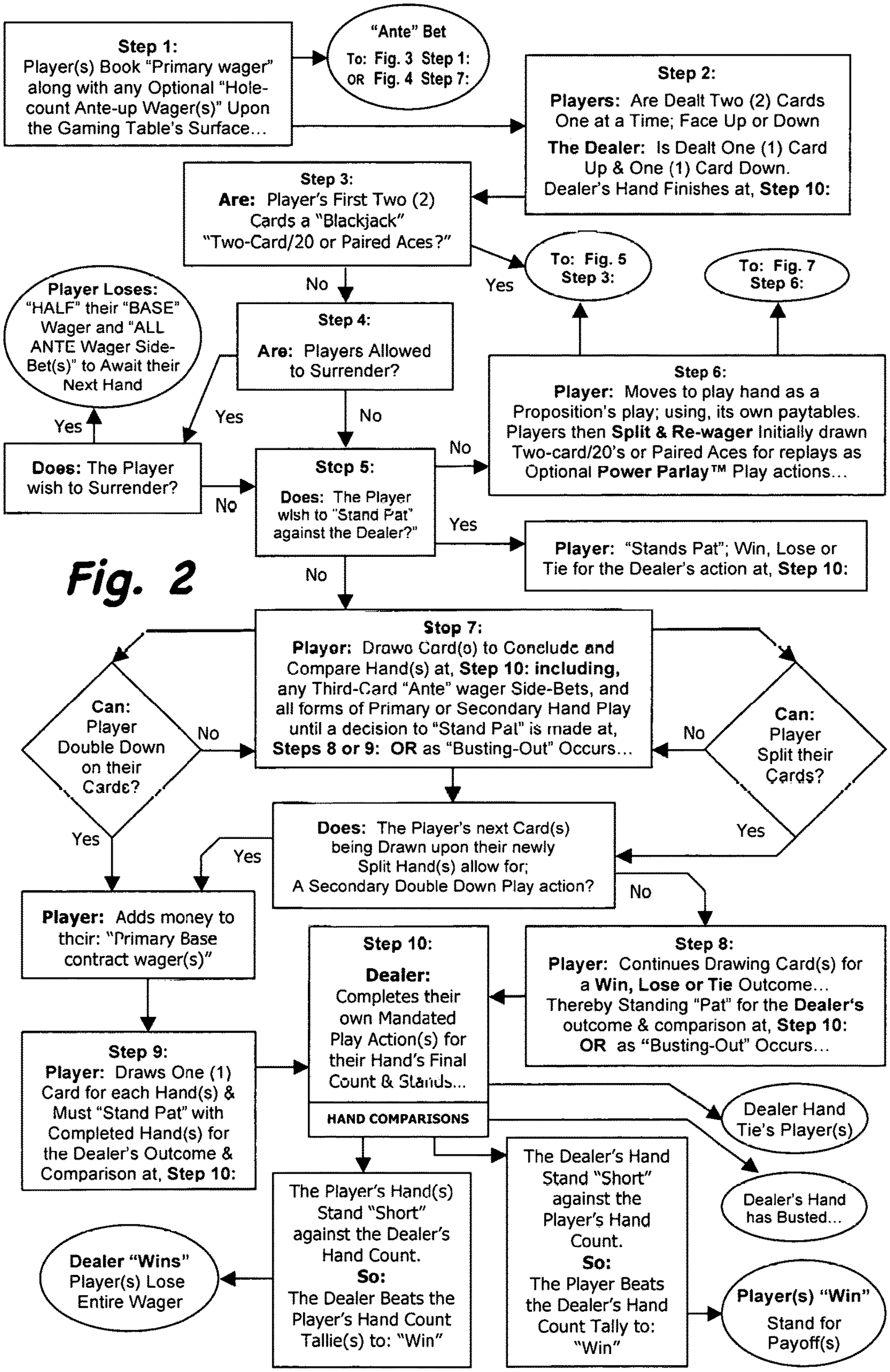
FIG. 2 Shows the flow of progressive event/decisions to complete a round of play.
Figure 3:
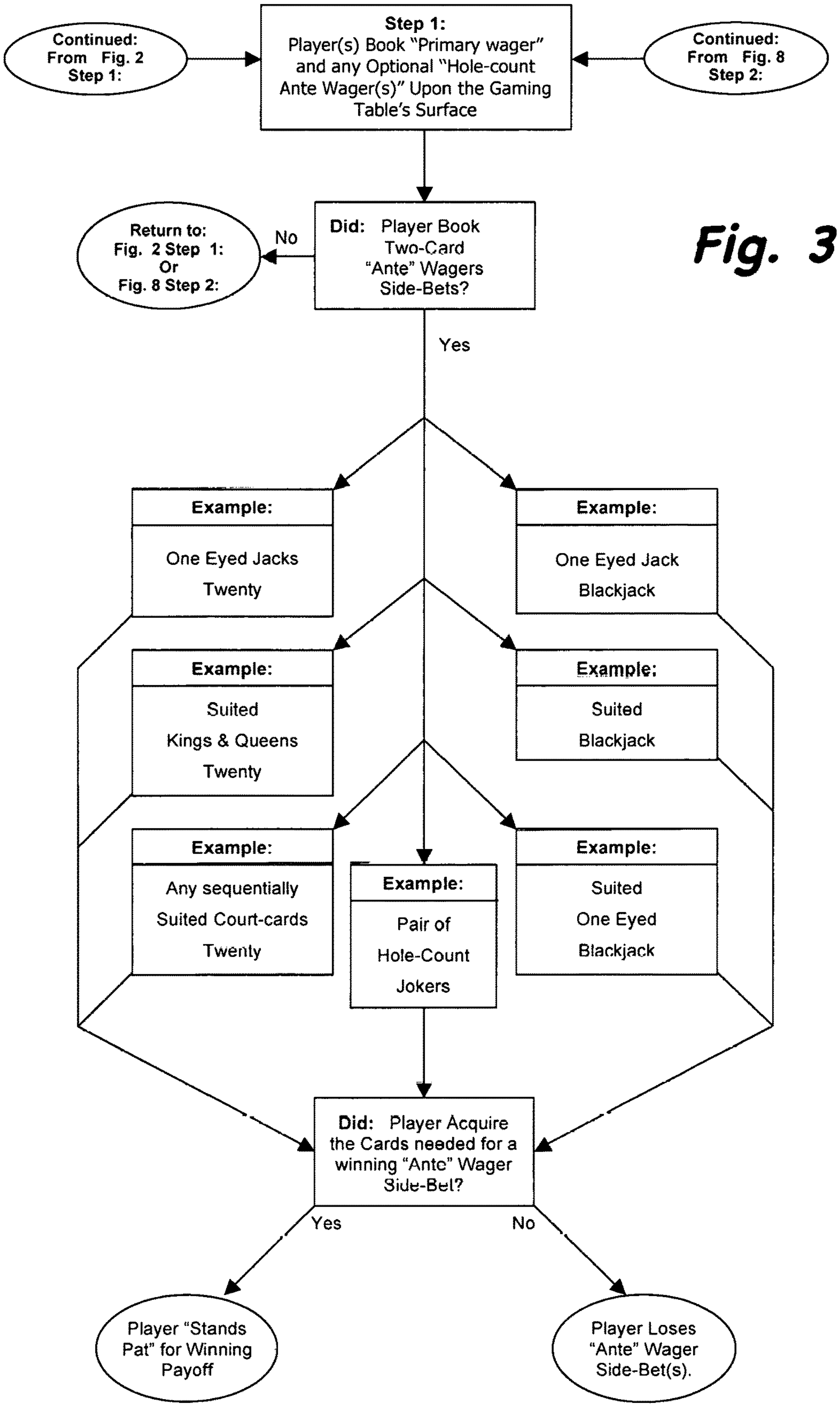
FIG. 3 Shows options for an initial first, two (2) card ancillary "Ante" type side-bets.

Therefore, as first inferred, and illustrated in complete detail within FIGS. 1 & 2: upon the booking of a required minimum contract wager and any optional "Ante" wager Side-bets being offered in the Base play action, as further shown in FIG. 3; a new hand begins with the acquisition of both the Player's and the Dealer's first two-cards.

Figure 5:
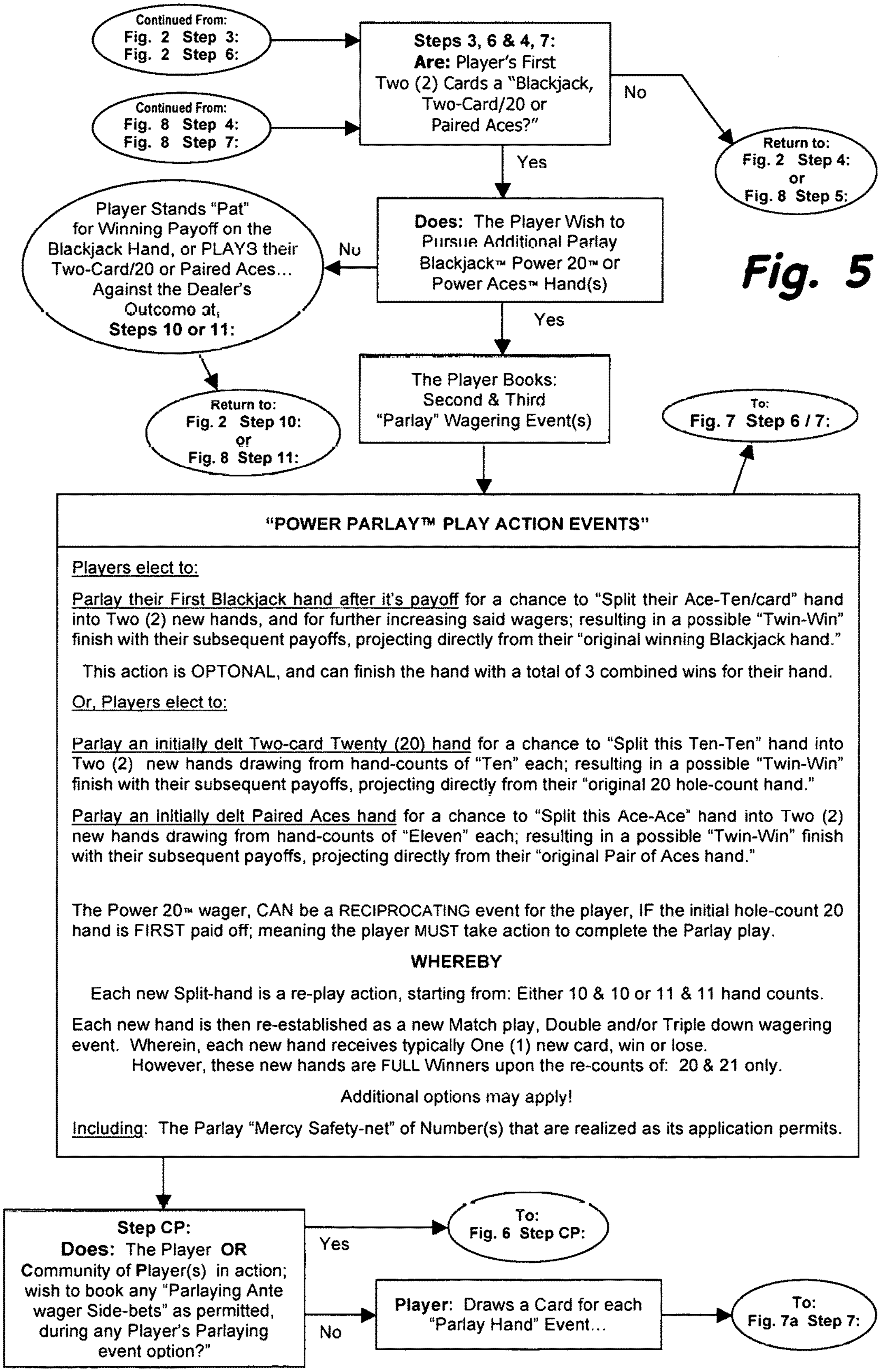
FIG. 5 Shows the PARLAY BLACKJACK™; POWER 20™; and, POWER ACES™ hands.

Next, the Dealer and each Player then assess their first two-cards to discover if a "Blackjack" has been dealt to them and, if so, does the Player wish to only receive their guaranteed win payment and stop, or do they wish to make a "Parlay-Split & Increase" for what then will become Two (2) new hands, whereby redrawing for each of the now Ace & Ten card hands, as discussed in great detail starting in, FIG. 5.

Also, as will frequently occur, this process will find Players holding hole-count Twenty (20), and paired Aces against a Dealer's Blackjack. However, a Player's potential Power 20™ or Power Aces™ hole-count hand set-up, is not automatic, they're still going to be frequent losers when the Dealer draws Blackjack, in-the-hole . . . .

Assuming then, that the Player hand(s) continue for the round, the Dealer then evaluates as they engage each Player if, any ancillary two-card winning hand tallies exist to include those of any two-card winning Ante wager Side-bets having been made, as shown in FIG. 3.

Figure 8:
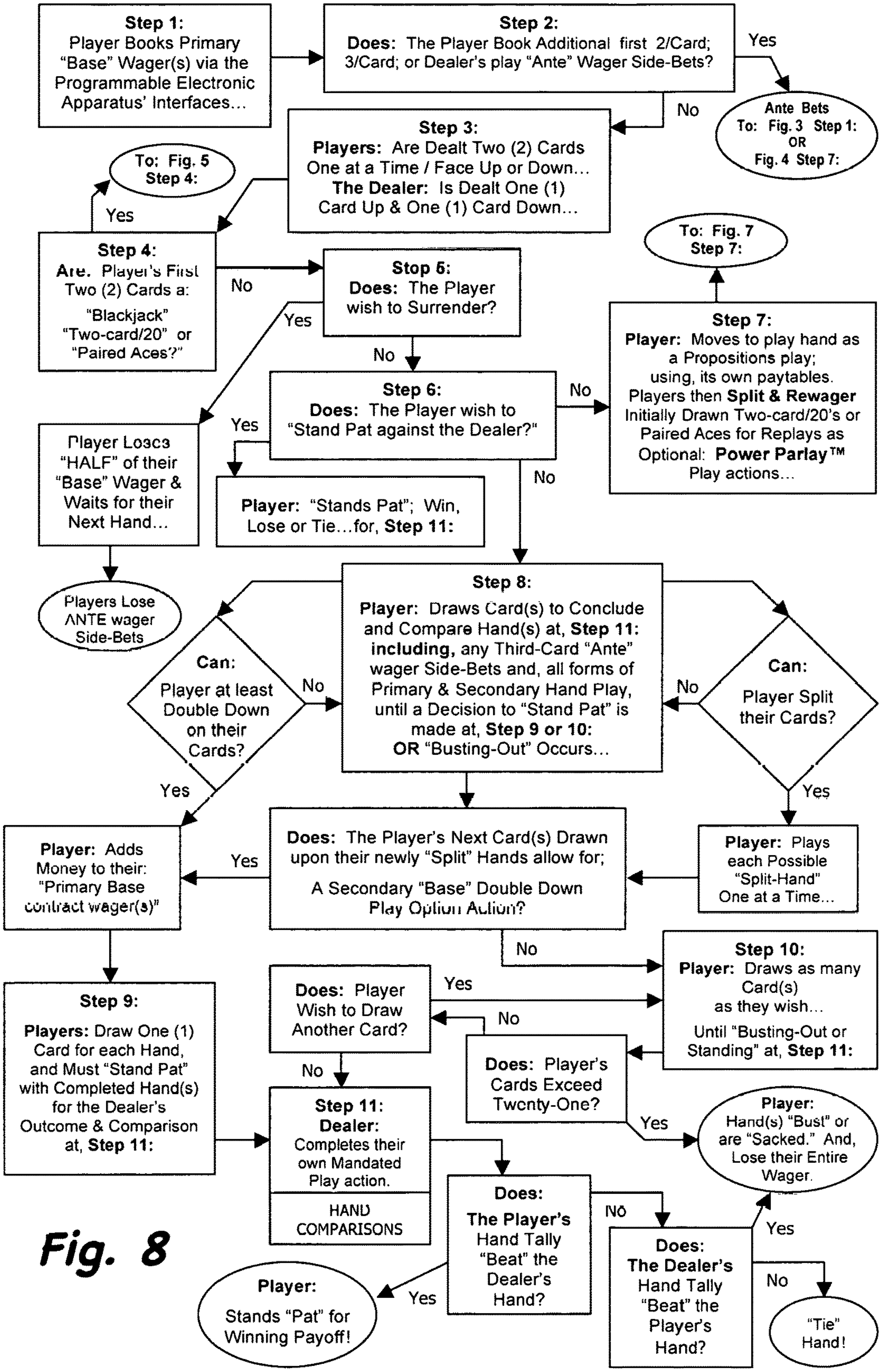
FIG. 8 Shows the flow of progressive event/decisions to complete a round of play for a programmable electronic apparatus and/or wireless devices being applied.

If not, then a decision to Surrender may be considered should that option be available to the Player, as illustrated in Step 4, and Step 5, of FIGS. 2 & 8, respectively. In the absence of an immediate winning or a standing hole-count tally outcome or a desire to Surrender their hand, Players will likely be compelled to draw at least One (1) new card as to, at least, avoid being "Sacked" with a poor hand count should they not be holding a "Pat" hand.

Figure 4:
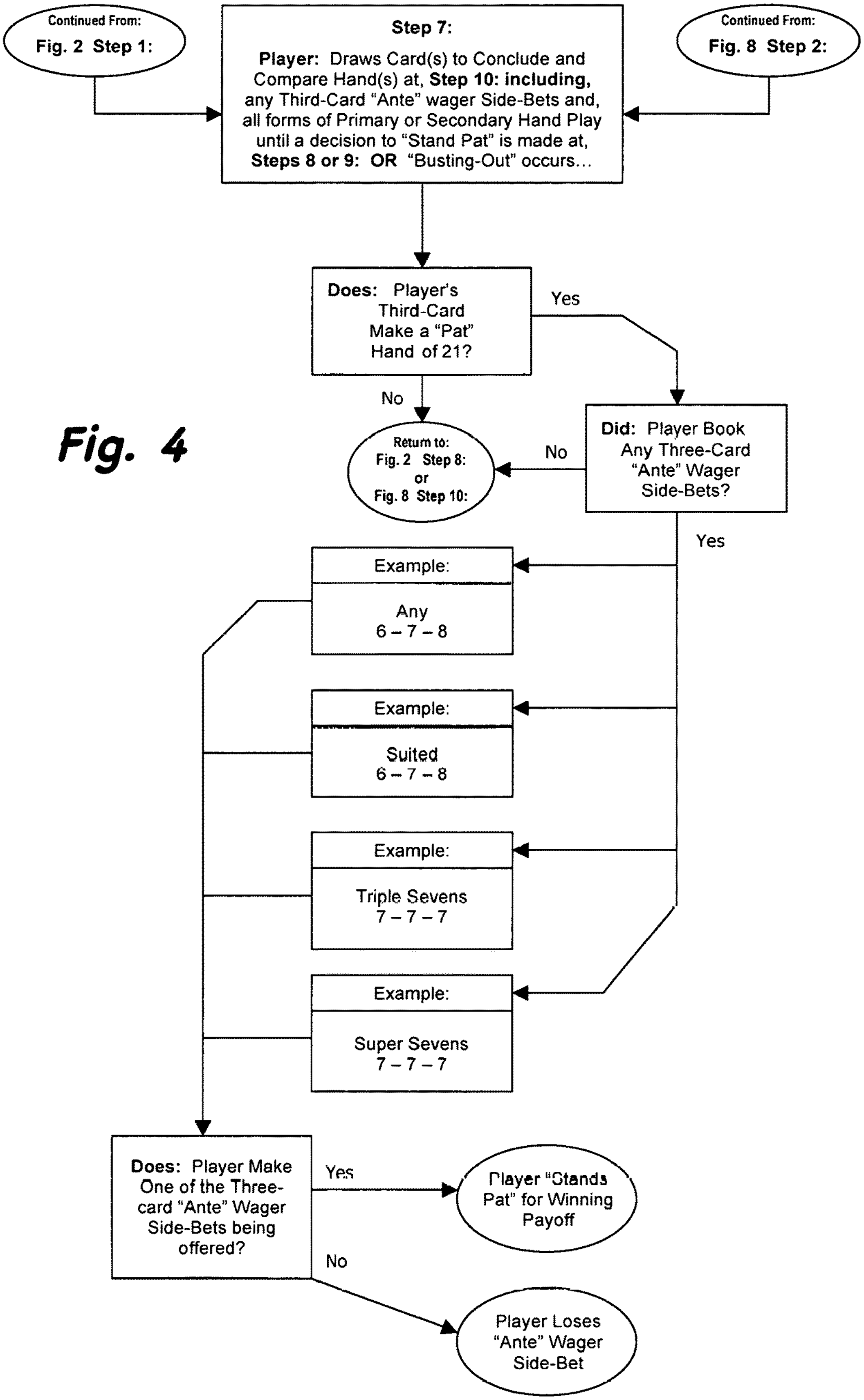
FIG. 4 Shows options for an initial first, three (3) card ancillary "Ante" type side-bets.

FIG. 4, shows optional wagers; Ante-ups, that are evaluated against the drawing of all third-cards.

Historically, it has always been the Player's prime motivation to draw and acquire a winning hand over that of Dealer's up-card possibilities while drawing as few cards as possible, even bypassing other play options to successfully engage their hand's play without Busting to achieve such ends.

Indeed, the general decision to draw card(s) can come with additional possibilities for Players either by Splitting any pair of equally valued cards, like: 2's, 3's, 4's-6's, 7's, 8's, 9's & Aces, or Doubling Down on their cards assuming their cards and the Dealer's up-card warrants such an action, or both Splitting and Doubling Down against what should then be a weak Dealer's up-card.

Figure 6:
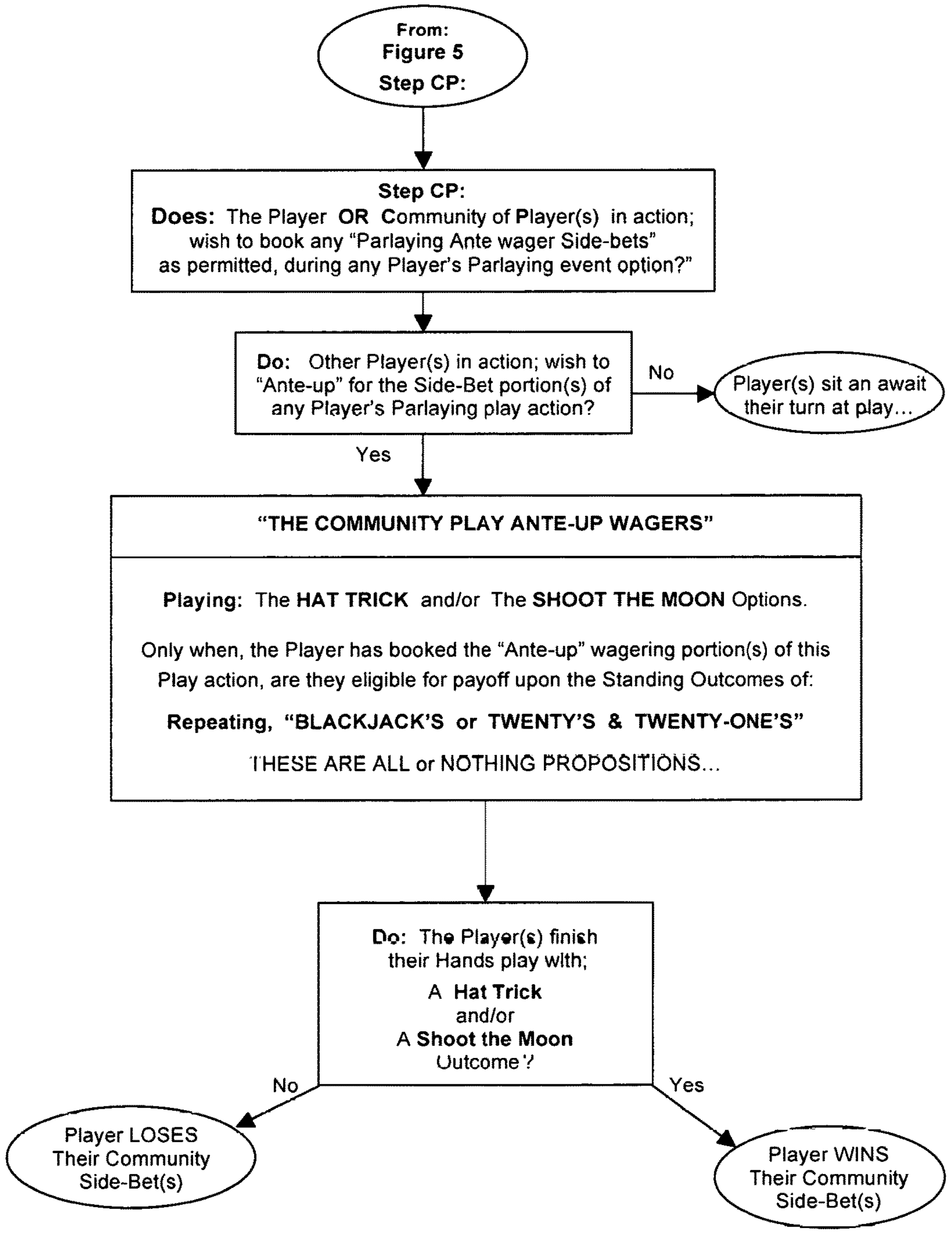
FIG. 6 Shows the HAT TRICK & SHOOT-THE-MOON Ante-up/outcome plays.

Moreover, further inclusive to the above optional play is the NOW, ability for Players to access "Power Parlay™" hands, upon all newly dealt Blackjack hands, and the many hole-count hands, dealt as 20/count and paired Ace's, which also may qualify for action as Power Parlay™ plays as again illustrated in Steps, 3, 6 & 4, 7: of FIGS. 5 & 6, respectively.

Figure 7:
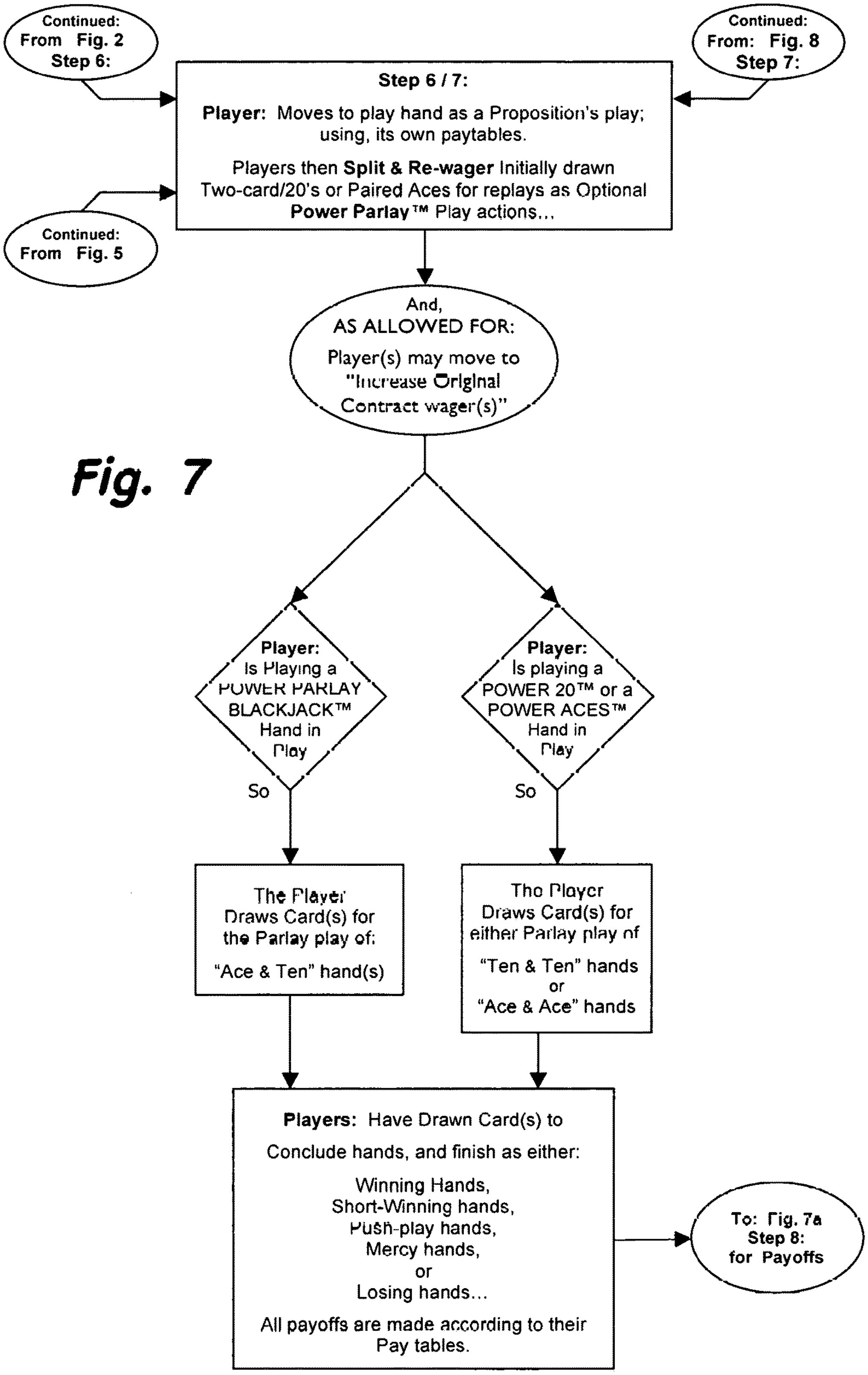
FIG. 7 Shows the process decisions for the Parlay of PARLAY BLACKJACK™; POWER 20™; and/or POWER ACES™ hands.
Figure 7A:
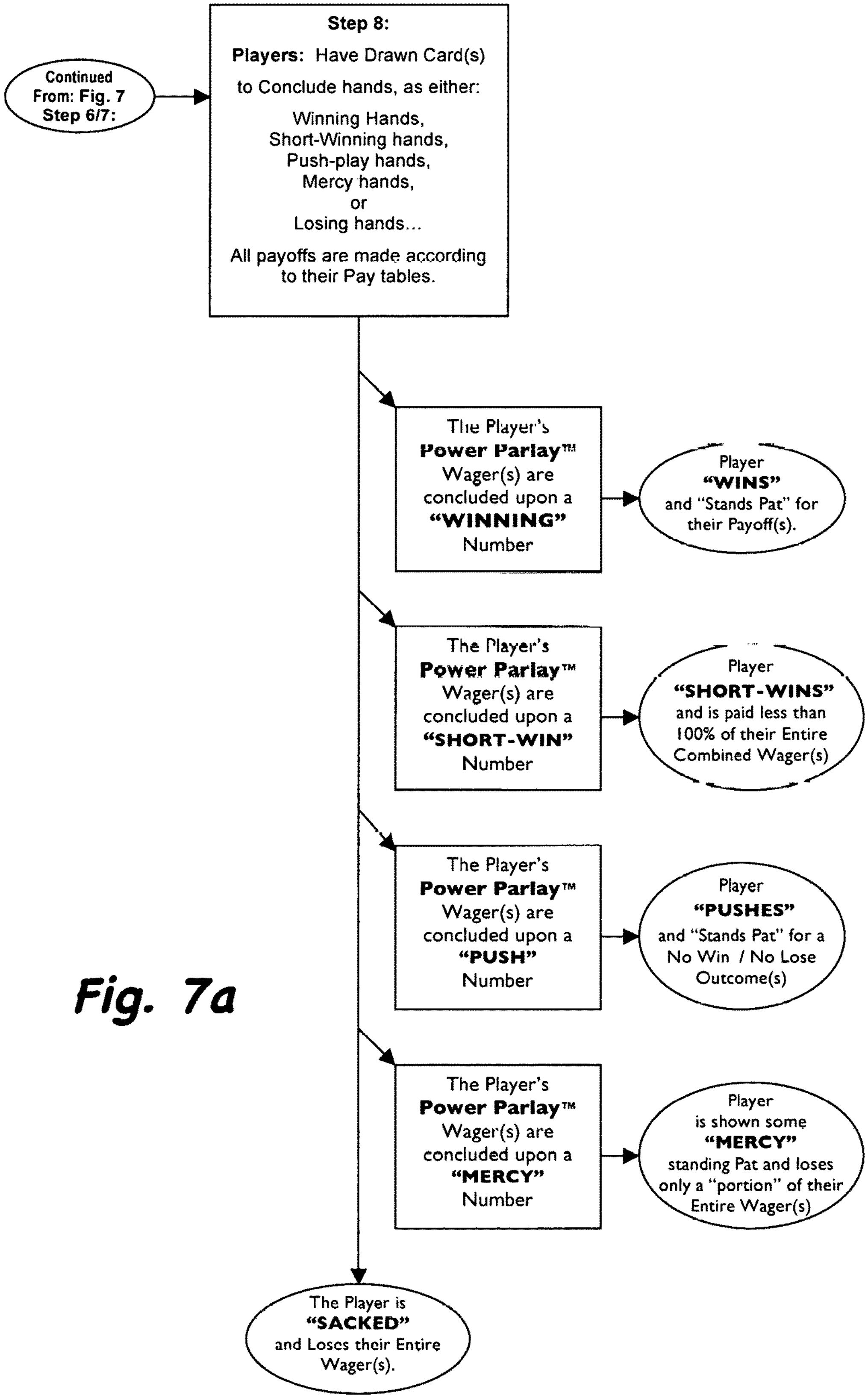
FIG. 7*a* Shows the broad consequences for play action.

FIGS. 7 & 7*a*, illustrate both the Parlaying comparisons between each type of Parlay play action, while these figures also show the extended means and methods for a hand's conclusion, as having been dealt.

Further anew to this process, are compelling "Community Ante-up" plays surrounding the three possible Parlay play actions, resulting in all Players being able to compound their winning opportunities each and everytime said Players elect to tag-a-long upon anothers' qualified play action event, as thoroughly discussed and illustrated in FIG. 6. However, FIG. 8, illustrates the indepth processes of operating this game with its innovations upon numerous types of electronic means, and there applied apparatuses. Whereas, FIGS. 9*a*, 9*b* & 9*c* in toto, show and tell about an exemplary model for general play action as a Housemaster, might authorize its play.

OPERATIONAL ADVANTAGES

Until now, within the practiced bounds of Blackjack, no one has ever establish a means to replay an already winning hole-count Blackjack hand into the kind of Parlay events for which the Applicants' now teach.

Neither have the Applicants ever personally heard of, or read about the idea of, or even the mere suggestion of, applying such rules supporting such play within the bounds of Blackjack.

Indeed, the Applicants' earlier breakthroughs, make possible all that is being newly revealed and promulgated into play, by virtue of expanding high value replays as discussed; via, at least the first three concocted Parlay wagers, and then as further complemented by the new after-the-fact/mid-hand entry Community accessible Ante-up wagering opportunities, all having clearly never been envisioned of, prior to the Applicants' presented revelations herein.

Additionally, the Applicants' introduction of Short-Wins, and/or Push plays acting part & parcel to a Mercy safety-net adaptation, where the Player is keeping a portion of their wager on an outcome of, say Nineteen (19), in example; this is also totally new to the public consciousness. Clearly, the Applicants are ameliorating the mathematical affects being pressed upon the Players at large, from this mix of Secondary Decision options, as being offered.

Also affecting the players of the Applicants' methodology is the wholly optional impact of Housemasters aggregating use of differing types of decks, and/or shoe configurations, being offered and applied during the game's play. As observed within the Paternal cases, these optional deck configurations were then simply identified as "modified decks." Moreover, as now clearly defined, these "modified decks" as applied for play action are envisioned as Carnival deck configurations, having Fifty (50) cards in play representing a "significantly fatter" House Vig-margin.

Yet, Spanish configured decks, as applied with Forty-eight (48) cards in play, adds an even more generous Vig-margin for Players to consume in play.

In play action support of the Applicants' methods, these deck configurations provide an extra wide measure of "core margin mathematics for redistribution" through the game's present "Base & Parlay" wagering methods; meaning, any and all wagers now in play action, or any wagers as may be coming in the future along with their payoffs.

Heretofore, if the Housemasters wanted better margin, they took Player advantages away, like the 3 to 2 payoff on Blackjacks, with "no reciprocating recourses" for the leveling the House's new advantage. Over time, this has lead, and will continue to lead to even higher player disinterest; risking smaller amounts of money, and leading to that ever growing pool of outright defections from play.

Actually, only 4.83% of hands are "hole-count Blackjacks" from a six-deck shoe. As for the magnitude of the Parlaying Blackjack hand, we will very often see players winning up to four (4) times, on an initial hole-count Blackjack win, when such Players make and win, all of the subsequent wagers stemming from their first Blackjack event for their hand in play.

This is truly a Master Amelioration at work . . . . With a "Mercy safety-net," luring Players into play time-after-time! Indeed, the safety-net buys the allure of more Time-In-Play for the Player; not Per Se, a SeaChange in inevitable result, and certainly not over the long run.

On the one hand, the Applicants' methodology sets precedence, by turning $10.00 dollar bettors into $20.00 dollar bettors, directly do to the ameliorating allure created particularly by the 3 to 2 Payoff of the PARLAY BLACKJACK™ outcomes as being applied, and experienced by Players.

Moreover, on the other hand, the House will also benefit from "Grind-Players" getting into the Blackjack actions of others; via, the Community Ante-up bets . . . . It's all just a "Grand Slam" of play actions for the Players, and House . . . is'nt it!

Furthermore, as it is revealed herein, the Applicants' methods also provide certain additional advantages when encompassed within, and deployed; via, the operation of interactive video gaming devices, as provided for the game, be they "wireless hand-held devices" or otherwise.

In considering the Applicants' modifications as applied to an electronic process for play, a broader scale of Player interactions being carried upon the interactive platform and software of a "Host apparatus" can now allow for the significant variations of regulatory law coming into effect, including "broader mathematical opportunity" and the fact that in mobile wireless or video mode, the Applicants' gaming process is also engaged into a "real time computing environment."

In this environment, the issuance of monetary units (i.e. credits) and their valuations are not as constricting upon the play-by-play action of the Applicants' processes for play. This means there are no human factors slowing the game to figure out what can now be a more sensitive fractional, even mill-age, addition or deduction to a Player's wager or payoff, when a decision to Stand Pat or to play is made.

Moreover, no human mistakes in calculation are possible either! Therefore, a perfectly worthwhile process for introducing the Applicants' modifications into the public's eye will be provided through either "Singularly Intimate" or "Community Style" play applications, and the like.

However, if played within a third party's electronic device or even a partial electronic device, displaying physical playing cards along with electronic wagering being made upon a virtual table's surfaces supporting such electronic interactions among its Players, it is then axiomatic; that Housemasters, would also require the use of state agency approved electronic equipment. Such computing equipment, is universally supported by numerous LAN/WAN networks, as being applied.

Insofar as to include, Player input/output interfaces, video screens, combination sources of processing power, huge memory applications, including flash memory and the like, battery's of RAM, EEPROM, storage software, RNG's and a litany of protocal functions for deploying the Applicants' software in operations, not to mention an amass of security functions operating in real time too. These very capabilities & protocols are prevalent in their present day third party availabilities. Today, the Applicants' gaming methods can be carried out upon a complete virtual reality platform for multi-player action, such as is disclosed in: U.S. Pat. No. 6,607,443 to Miyamoto et. al., for just one example. The content of this very Patent, and the many others providing such methods and means, is hereby observed and incorporated by reference.

Another "value added" aspect of the video application process is that ability to string any number of video units and/or wireless hand held devices together for community play across any number of geographical localities throughout the world; supporting, any number of traditional Base and/or Proposition type wagers, or batteries of ancillary Ante wager type Side-bets and/or progressive "Jackpot" opportunities.

And, if that's not enough, how about all of the tournament play possibilities! Indeed, today's Blackjack, even considering the numerous proprietary Side-bets as provided, have nowhere near the alluring innovations nor the margins, the Applicants' means offer.

Also, particularly when utilizing "Spanish decks" within an electronic gaming apparatus, a consideration to engage a "discard process" regarding a "Player's initial hole-count draw" could be considered from the onset of each new round at play.

As for the gaming industry, casinos can once again offer their patrons an exciting addition to traditional Blackjack that is simple to grasp, and at times, can prove to be even more generous to their patron's Time-In-Play. Yet, all the while, this game will draw-out much larger sums of capital across its play action environment(s) with greater ease in shorter spans of time.

From the Player's continuum perspective, the Applicants believe that given the totality of their featured Secondary Decision options as played-out; via, the game's Propositions, along with their Community Ante-ups, having been so thoroughly disclosed and discussed herein, there exists just the right incentives necessary for reinvigorating the entirity of the Blackjack franchise, even on a worldwide basis . . . .

Accordingly, the present invention has been described with respect to specific methods, modifications & models along with an effective counsel embodiment being shown. Likewise, it will be understood that various changes and further modifications will be suggested by those skilled in the art. Therefore, it is the intent of the Applicants' to anticipate such changes and modifications as falling within the scope of the appended claims.

We claim:

1. A method to proliferate a proprietary compendium of play action events, via gaming processes that operate within the bounds and means of a modified game of blackjack, which utilizes the tool of any acceptably configured or modified decks of physical playing cards, as being applied in direct support of a wholly proprietary community of side-betting procedures, whereby directly benefiting housemasters and players thereof, comprising:

said proprietary compendium of play action events, happening through said gaming processes operating within the bounds of said modified game of blackjack, are now providing a means for players to engage a mid-hand entry method to simultaneously access said proprietary community of side-betting procedures, as being anted-up for by players, via any qualified parlay hand being played;

said, community of side-betting procedures as being anted-up for by players, are operating in play action, as said compendium play action events, by means of a hat-trick event or a shoot-the-moon event, or both as wagered for during play;

said, proprietary compendium of play action events, are inclusively accessible to players, of whom are tagging-along in their participation, via said means of a hat-trick event or a shoot-the-moon event, or both as wagered for during play;

also, said proprietary community of side-betting procedures supporting said compendium of play action events can occur, via each consecutive player's play action hands during each round of play, whereby said side-betting methods only qualifies for play action as it's applied, after-the-fact of, and to, any initially drawn hole-count blackjack hand, hole-count two-card 20 hand, or hand of paired aces, being parlayed, as initially drawn in-the-hole outcome draw of cards, starting each new round of play.

2. A modified game of blackjack proliferating affiliated compendium play action wagers, while utilizing any acceptably configured or modified decks of electronically simulated card play being distributed, via programmable electronic gaming apparatuses, deploying mid-hand entry procedures for participating in a wholly proprietary community access of side-betting event wagers, whereby directly benefiting housemasters and players thereof, further comprising:

said, modified game of blackjack also proliferating affiliated compendium play actions, via the utilization of said programmable electronic gaming apparatuses capable of applying any proprietary software of the day, including the utilization and display of standardized or modified decks of cards in play, for which the fully utilized functions of the host electronic apparatus with its software programmings are projecting all of the required security details, simulations and displays for competent play, therefrom;

prompting, as many qualified parlayable player hands as being drawn in-the-hole during each new round, to be played-out along with a simultaneous option to access said affiliated compendium of community ante-up side-betting events, as all being facilitated in action, during said modified game of blackjack;

said, affiliated compendium wagering events being facilitated, via said qualified parlayable hands being initially drawn in-the-hole, are enabled for players, by means of deploying a mid-hand entry procedure that opens up, said community access of side-betting play actions, via either the means of a hat-trick event or a shoot-the-moon event or both, as being wagered for during play;

also, simultaneously engaging said affiliated compendium wagering events being facilitated, via said qualified parlayable hands being initially drawn during said new round, are an additional number of players for whom, are only tagging-along in their access of said deployed means of a mid-hand entry procedure, that does open up said community access for side-betting play actions, via said means of a hat-trick event or a shoot-the-moon event or both, as wagered for during play.

* * * * *